(12) United States Patent
Lanie

(10) Patent No.: US 7,453,168 B2
(45) Date of Patent: Nov. 18, 2008

(54) WIND-POWERED GENERATOR SYSTEM FOR GENERATING ELECTRIC POWER OVER A WIDE RANGE OF WIND CONDITIONS

(76) Inventor: Robert C. Lanie, 22164 Canones Cir., Saugas, CA (US) 91350

( * ) Notice: Subject to any disclaimer, the term of this patent is extended or adjusted under 35 U.S.C. 154(b) by 44 days.

(21) Appl. No.: 11/732,390

(22) Filed: Apr. 2, 2007

(65) Prior Publication Data
US 2008/0238106 A1 Oct. 2, 2008

(51) Int. Cl.
*F03D 9/00* (2006.01)
(52) U.S. Cl. .......................... 290/55; 290/44
(58) Field of Classification Search .................. 290/55, 290/44
See application file for complete search history.

(56) References Cited

U.S. PATENT DOCUMENTS

| | | | | |
|---|---|---|---|---|
| 3,426,214 A * | 2/1969 | O'Malley | ..................... | 290/55 |
| 3,473,038 A * | 10/1969 | Hakkarinen | .................. | 290/44 |
| 4,160,170 A * | 7/1979 | Harner et al. | .................. | 290/44 |
| 4,321,476 A * | 3/1982 | Buels | ........................... | 290/55 |
| 4,350,900 A * | 9/1982 | Baughman | .................... | 290/55 |
| 5,644,170 A * | 7/1997 | Bynum et al. | ................. | 290/43 |
| 6,849,964 B2 * | 2/2005 | Becherucci et al. | ........... | 290/55 |
| 6,955,521 B2 * | 10/2005 | Yang | .......................... | 415/4.2 |
| 7,218,011 B2 * | 5/2007 | Hiel et al. | ..................... | 290/43 |
| 7,256,512 B1 * | 8/2007 | Marquiss | ...................... | 290/55 |
| 2005/0104379 A1* | 5/2005 | Haskill | ........................ | 290/44 |
| 2006/0140760 A1* | 6/2006 | Saddoughi et al. | ............ | 416/23 |
| 2007/0126240 A1* | 6/2007 | Richards et al. | ............... | 290/55 |
| 2007/0284885 A1* | 12/2007 | Menges | ......................... | 290/55 |
| 2008/0150292 A1* | 6/2008 | Fedor et al. | .................... | 290/55 |
| 2008/0150293 A1* | 6/2008 | Calhoon | ....................... | 290/55 |

* cited by examiner

*Primary Examiner*—Joseph Waks
(74) *Attorney, Agent, or Firm*—Raymond M. Galasso; Galasso & Associates, LP

(57) ABSTRACT

A wind-powered turbine generation system configured to generate electric power over a wide range of wind conditions and particularly in high wind speed and wind gust conditions. A plurality of ducted turbines is provided in an enclosure rotatably mounted to a vertical support. Rows of magnetic irises surround the turbine shafts with each iris adjustable to throttle the airflow over the turbine blades, permitting the turbine generator to operate in high wind velocity gusts.

13 Claims, 4 Drawing Sheets

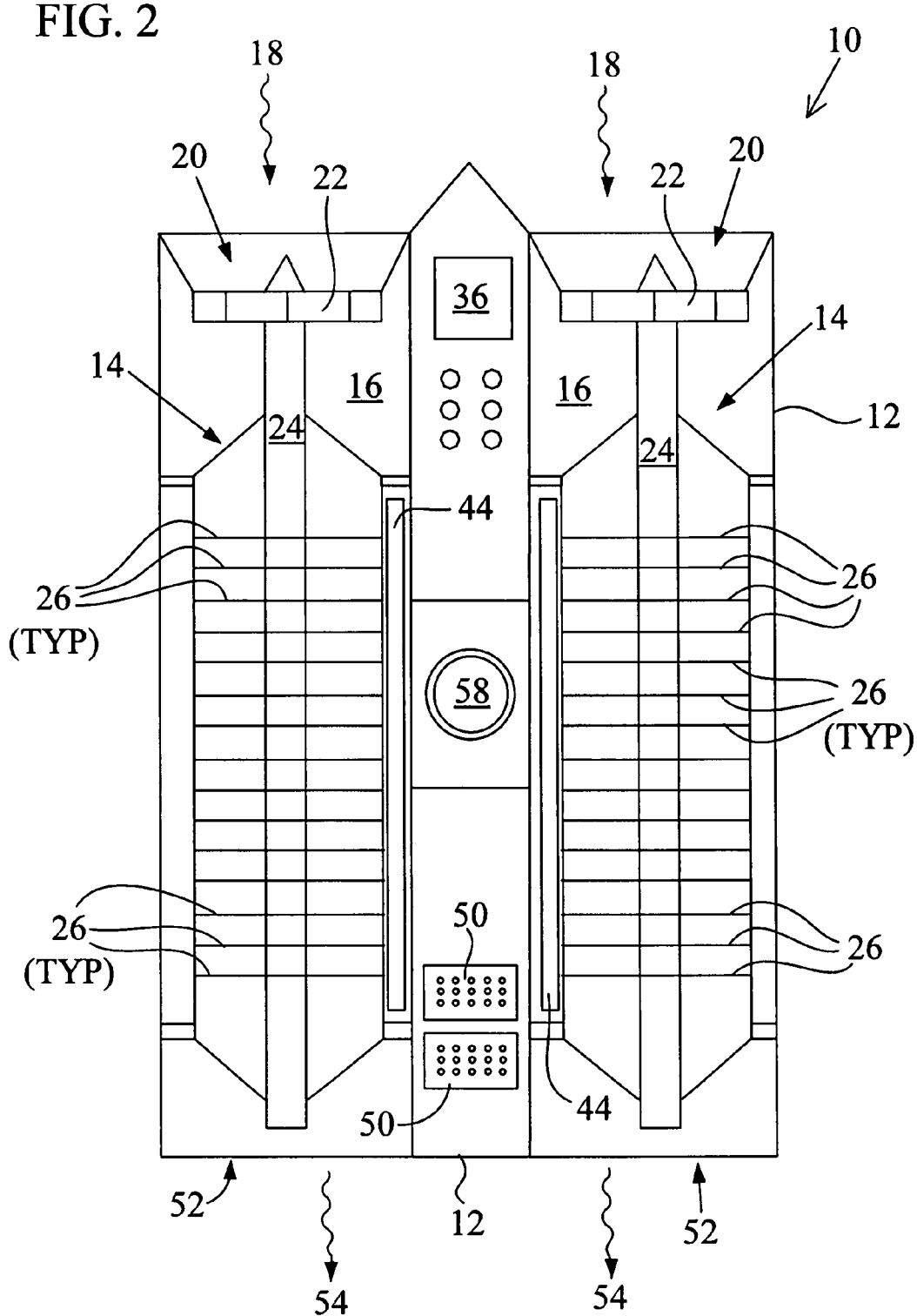

WIND-POWERED GENERATOR SYSTEM FOR GENERATING ELECTRIC POWER OVER A WIDE RANGE OF WIND CONDITIONS

FIELD OF THE DISCLOSURE

The disclosures made herein relate generally to wind turbines for converting wind energy into electric energy and, more particularly, to wind turbines configured and adapted to generate electric power from wind energy over a wide range of wind conditions, and particularly in high wind speed and wind gust conditions where current wind turbine technologies fail to take advantage of the higher energies available.

BACKGROUND

As the world economic and population growth causes increased energy demand that is now exceeding the world's production capacity of oil and fossil fuels, attention is increasingly drawn to renewable energy resources such as solar power and wind turbines. Wind turbines have been in use for some time, particularly in remote and rural areas where electric supply may be limited or unreliable. With the increasing interest in renewable energy, wind turbine generators are being built in increasingly large numbers and in larger power generation sizes. Wind generation farms are being developed, particularly near coastal areas, in elevations such as the Rocky Mountains and in other areas where conditions are favorable for a substantially continuous supply of wind to power the operation of turbine generators.

A limitation of current wind turbine generators is that current technology limits manageable productive wind speeds to the range of about 13 to 18 miles per hour. Conventional wind turbine generators are optimized to generate power during low wind speeds and at a slow but constant level. This method works to generate power, but it is not the most efficient way to harness energy considering the sheer force that wind gusts can produce.

Therefore, there remains a need in the art for a wind turbine generator that is designed to generate electrical power in a wide range of wind conditions including high wind speeds and gusts that provide more energy.

SUMMARY OF THE DISCLOSURE

Accordingly, embodiments of the inventive disclosures made herein comprise various embodiments of a wind-powered generator for producing electric power from the kinetic energy of wind gusts and is capable of producing electric power over a wide range of wind velocity and gust conditions.

In embodiments of the inventive disclosures made herein, the wind-powered generator for generating electric power over a wide range of wind conditions includes one or more ducted wind turbines secured into an enclosure, with the enclosure rotatably mounted in an elevated position on a vertical support member. The enclosure includes at least one ducted chamber sized and adapted to receive a wind turbine therein. The ducted chamber and enclosure are configured to efficiently guide wind driven airflow through the ducted chambers with the wind driven airflow entering the air intake portion of the enclosure and exiting the air exhaust portion of the enclosure. The air inlet portion and air outlet portions are on opposing sides of the enclosure. One or more fins are secured to the top portion of the enclosure with the fins sized and adapted to urge the enclosure to rotate upon the vertical support member under the influence of wind impinging upon sides of the fin so as to position the air intake portion of the enclosure with the air intake portion of the enclosure facing into the wind. At least one and preferably six wind turbines are provided in the enclosure. Each wind turbine includes a turbine shaft which is rotatably mounted into a duct shaped or ducted chamber within the enclosure. A plurality of turbine fan blades are secured onto the turbine shaft and adapted such that airflow over the turbine blades urges the turbine shaft to rotate, thereby converting the kinetic energy in the airflow into mechanical rotational energy in the turbine shaft. An electric generator is driveably coupled to the turbine shaft such that kinetic energy in the wind or airflow through the ducted chamber and over the turbine blades is converted to electrical energy at the generator. At least one row and preferably a plurality of rows of magnetic irises are secured within the ducted chamber surrounding the turbine shaft. The magnetic irises each have an adjustable opening in a center portion of the iris. The diameter of the iris opening is adjustable between a minimum diameter and a maximum diameter. The iris opening is adjustable to throttle the airflow through the ducted chamber and over the turbine blades to permit the turbine and generator to operate in high wind velocity gusts. The wind-powered generator for generating electric power over a wide range of wind conditions includes at least one and preferably a plurality of electrically operated means of adjusting the adjustable diameter of the irises. The wind turbine generator is configured such that wind impinging upon the turbine fan blades urges the turbine shaft to rotate with the turbine shaft driveably rotating the rotor of the electric generator to generate electric power. A wind speed sensor is secured to an exterior surface of the enclosure. The wind speed sensor is configured to produce an electrical signal proportional to wind speed over the sensor such that the output signal is proportional to the wind speed. A microprocessor based iris control unit is provided in and secured within the enclosure. The wind speed sensor and the means of adjusting the irises are electrically interfaced to a microprocessor based iris control unit. The microprocessor based iris control unit is configured and adapted to command the mentioned afore means of adjusting the iris opening such as to adjust the adjustable diameter of each iris so as to optimize the power output of the generators according to the measured wind speed signal. At least one rechargeable battery is secured in the enclosure to provide continuous power to the iris control unit, the battery being rechargeable by the generators.

In one or more embodiments of the inventive disclosures made herein, the wind-powered generator for generating electric power has a vertical support member that includes at least two annular copper pickup rings, and the generators transfer electrical energy to the annular pickup rings by way of electrically conducting brushes positioned to contact the rings. These generators are electrically connected to transfer generated power from the generators within the rotatable enclosure to the annular rings of the vertical member. The rings and pickup brushes permit the enclosure to rotate on the vertical support member to maintain the intake side of the enclosure facing the wind while providing for the transfer of generated electrical power between the enclosure, wind turbine generators and the vertical support member.

In one or more embodiments of the inventive disclosures made herein, the wind-powered generator for generating electric power utilizes lubricated ball bearing to rotatably support and interface the enclosure on the vertical support member.

In one or more embodiments of the inventive disclosures made herein, the wind-powered generator for generating electric power has a microprocessor base iris control unit that is adapted to optimally generate electric power from wind gusts and higher speed winds by regulating airflow through the turbine fan blades with the airflow regulated by real time adjustment of the adjustable diameter irises in response to wind speed sensed by the wind speed sensor.

In one or more embodiments of the inventive disclosures made herein, the wind-powered generator for generating electric power includes a small electric generator rotatably connected to the wind speed sensor on the enclosure. The small electric generator is configured and adapted to electrically power the microprocessor based iris control unit during times when the wind is of sufficient strength to do so. The microprocessor based iris control unit relies upon electric power from the storage batteries during times when wind conditions are not sufficient to support the electrical power needs through the small generator.

In one or more embodiments of the inventive disclosures made herein, the wind-powered generator for generating electric power utilizes a cylindrical column as the vertical support member.

In one or more embodiments of the inventive disclosures made herein, the wind-powered generator for generating electric power includes six wind turbines in the enclosure.

In one or more embodiments of the inventive disclosures made herein of the wind-powered generator for generating electric power, the air intake portion of the enclosure is beveled to improve airflow through the wind turbines.

In one or more embodiments of the inventive disclosures made herein of the wind-powered generator for generating electric power, the wind turbine irises each include gear teeth formed on the periphery edge of the iris. An electric motor is configured with a mating worm gear to meshably engage and drive the gear teeth of the irises so as to provide adjustment of the adjustable diameter hole in each iris.

In one or more embodiments of the inventive disclosures made herein, the wind-powered generator for generating electric power includes an electric motor driveably coupled to rotate the enclosure on the vertical support member. In these embodiments the microprocessor based iris control unit is configured and adapted to command the electric motor to rotate the enclosure to maintain the air intake portion facing the wind.

In one or more embodiments of the inventive disclosures made herein, the wind-powered generator for generating electric power utilizes turbine fan blades having a similar design profile to conventional jet engine turbine fan blade designs.

In one or more embodiments of the inventive disclosures made herein, the wind-powered generator for generating electric power utilizes carbon fiber materials for the enclosure.

In one or more embodiments of the inventive disclosures made herein, the wind-powered generator for generating electric power utilizes an iris design in which each iris is one quarter inch thick and wherein the irises are spaced to provide one quarter inch of space between adjacent irises.

It is an objective of the inventive disclosure made herein to provide a wind turbine generator that is designed to generate electrical power from high wind speeds and gusts above the 13 to 18 miles per hour wind speed range of conventional wind turbine generators.

It is another objective of the inventive disclosure made herein to provide a wind turbine generator system that packages wind turbine generators in a closer spacing and higher density than conventional wind turbine generators.

It is another objective of the inventive disclosure made herein to provide a wind turbine generator system that provides multiple wind turbine generators per housing, permitting multiple wind turbine generators to be supported from a single pole or vertical support member.

It is another objective of the inventive disclosure made herein to provide a wind turbine generator system that is suitable for operation on off-shore oil platforms, high rise building and in other locations that are subject to intermittent or sustained wind gusts.

These and other objects of the invention made herein will become readily apparent upon further review of the following specification and associated drawings.

BRIEF DESCRIPTION OF THE DRAWINGS

The drawings show a form of the invention that is presently preferred; however, the invention is not limited to the precise arrangement shown in the drawings.

FIG. 2 depicts a sectional schematic view along 2-2 of FIG. 1 depicting two wind turbines and other internal components in accordance with the inventive disclosures herein.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Turning now to FIGS. 1, 2, 3A, 3B, and 3C.

Figure 1:
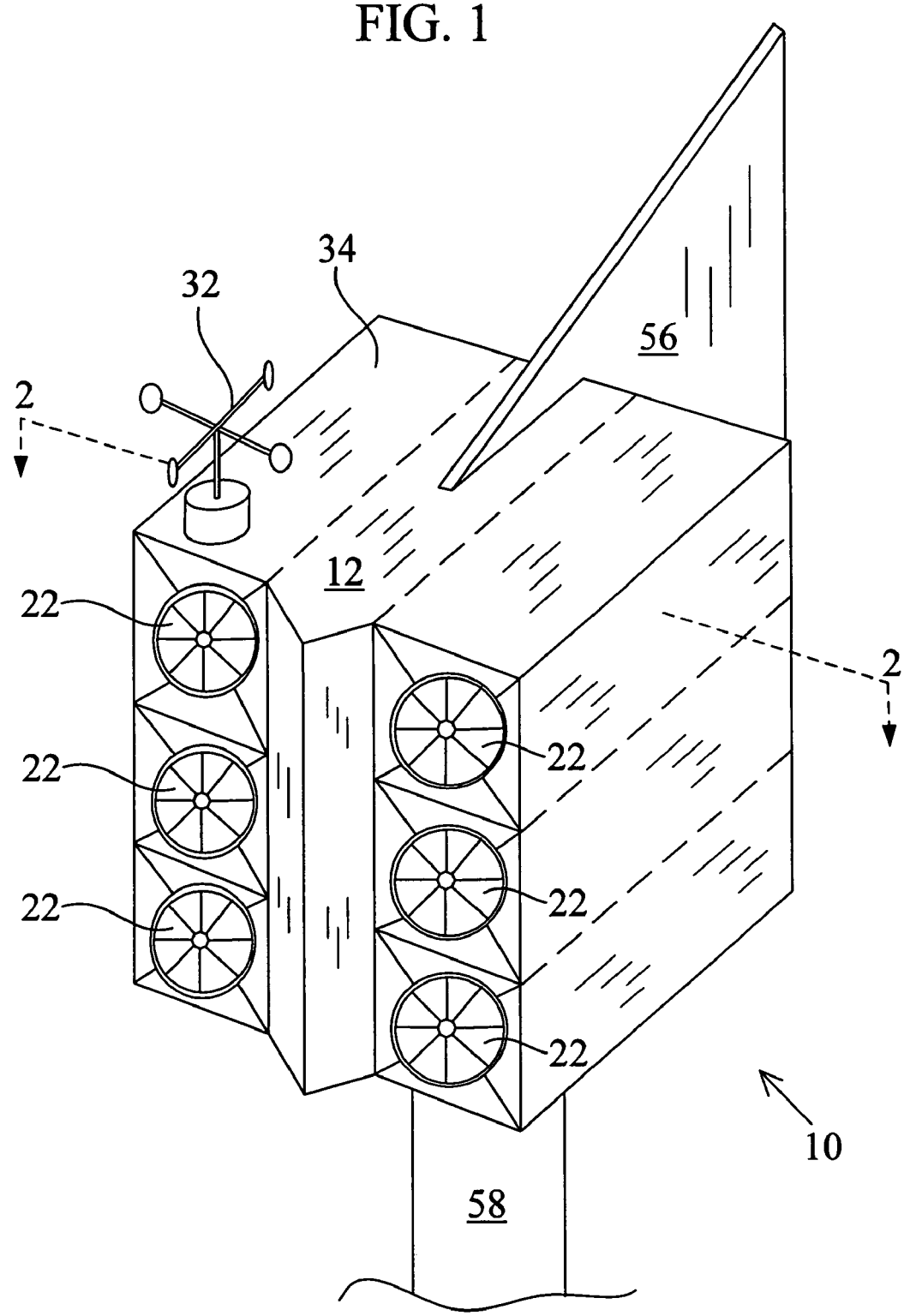
FIG. 1 depicts a perspective view of one embodiment of a wind-powered generator system for generating electric power over a wide range of wind conditions in accordance with the inventive disclosures herein.
Figure 3A:
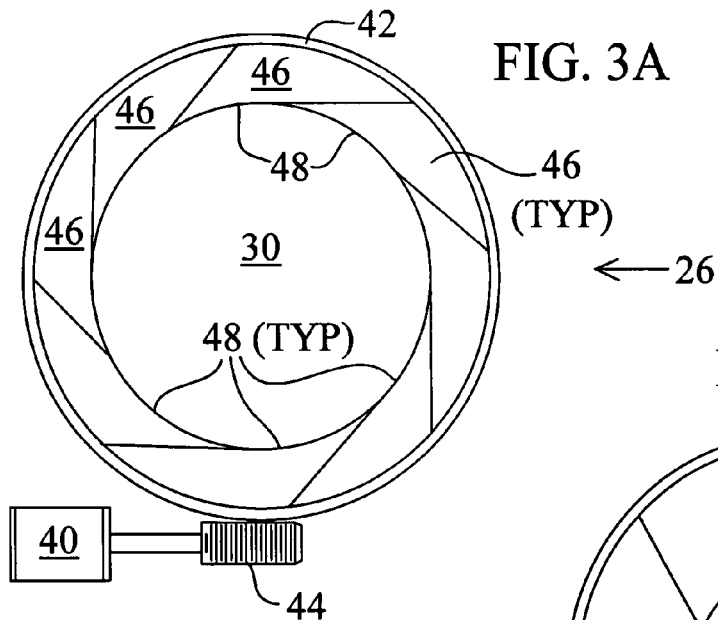
FIGS. 3A-3C schematically depict the operation of a magnetic iris, as arranged in parallel rows along the wind turbine shaft conditions in accordance with the inventive disclosures herein.
Figure 3B:
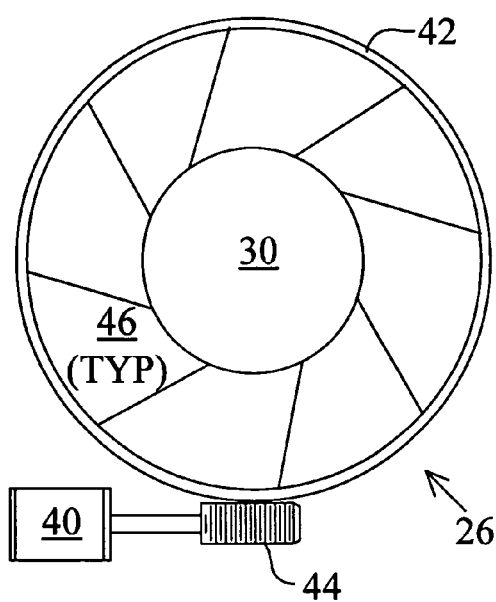
Figure 3C:
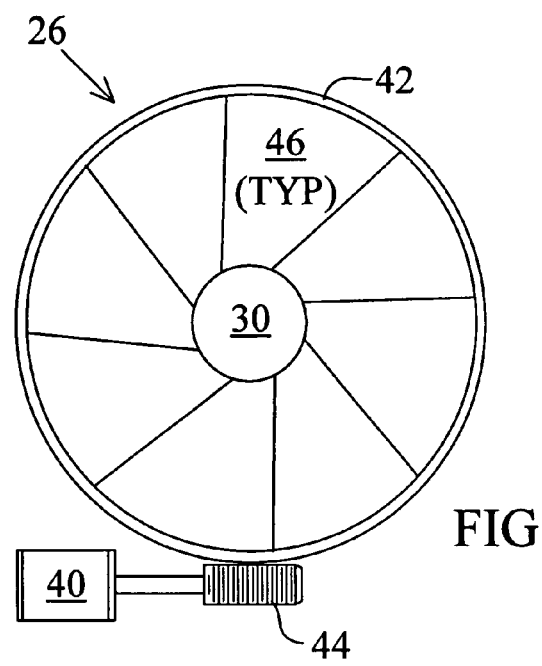

FIG. 1 depicts a perspective view of one embodiment of a wind-powered generator 10 for generating electric power over a wide range of wind conditions in accordance with the inventive disclosures herein. FIG. 1 depicts an enclosure 12 housing six wind turbine generators 14. It is to be understood that the invention is not limited to the use of six turbines in a housing, but may instead have any number of turbines per housing. Packaging multiple turbines in a single housing 12 allows more wind turbines to be positioned in closer proximity to each other, allowing better utilization of available space than would be possible with single turbine per housing installations, thereby permitting higher density installations. Each wind turbine generator is installed in a ducted housing 16 that is configured to direct and channel wind driven airflow 18 to enter the air intake portion 20 of the enclosure 12 where the airflow 18 impinges upon the turbine fan blades 22. One or more rows of turbine fan blades 22 are secured to the turbine shaft 24 such that airflow 18 over the turbine blades 22 urges the turbine shaft 24 to rotate, thereby converting the kinetic energy in the airflow 18 into mechanical rotational energy in the turbine shaft 24 which is then converted to electrical energy at the generator. At least one row and preferably a plurality of rows of magnetic irises 26 are secured in the ducted chamber 16 surrounding the turbine shaft 24. The magnetic irises each have an adjustable opening 30 (shown on FIGS. 3A, 3B and 3C) in a center portion of the iris 26. The diameter of the iris opening is adjustable between a minimum diameter (illustrated in FIG. 3C) and a maximum diameter (illustrated in FIG. 3A). The iris opening 30 is adjustable to throttle the airflow 18 through the ducted chamber 16 and over the turbine blades 22 to permit the turbine and generator to operate in high wind velocity gusts.

A wind speed sensor 32 is secured to an exterior surface 34 of the enclosure 12. The wind speed sensor 32 is configured to produce an electrical signal proportional to measured wind speed over the sensor 32 such that the output signal is proportional to the measured wind speed. A microprocessor based iris control unit 36 is provided in and secured within the enclosure 12. The wind speed sensor 32 is electrically interfaced to the microprocessor based iris control unit 36 providing real time measurement data of wind conditions. An electrically operated means of adjusting the opening 30 or the irises 26 such as electric drive motors 40 are provided. In the illustrated exemplary embodiment each iris 26 is provided with its own drive motor 40; however, it is to be understood that multiple irises may be driven by a shared or common drive motor 40. Drive motors 40 driveably engage the gear teeth 42 through the worm gear 44 to effect adjustment of the adjustable diameter iris opening 30. The irises 26 are similar in configuration to known camera irises; however, in the wind turbine generator the irises are substantially structurally more robust and of much larger diameter. Each iris 26 includes multiple moveable leaves 46 which are driven by the gear teeth 42. Each leaf 42 has a magnetized inner edge 48. The iris drive motors 40 of each wind turbine are arranged into a row of drive motors 44 located near the periphery gear teeth 42 of the irises 26. The iris drive motors 40 are electrically interfaced to and controlled by the microprocessor based iris control unit such that the irises are driven to adjust the diameter of the opening 30 of each iris 26 so as to optimize the power output of the generators according to the measured wind speed signal from the wind speed sensor 32. At least one rechargeable battery 50 is secured within the enclosure 12 to provide continuous power to the iris control unit 36. The batteries 50 are recharged by operation of the wind turbine generators. Airflow 54 exits the enclosure 12 at the exit air portion 52 of the enclosure 12.

A fin 56 is secured to the top portion of the enclosure 12 with the fin 56 sized and adapted to urge the enclosure 12 to rotate about a vertical support member 58 under the influence of wind impinging upon the sides of the fin 56 so as to position the air intake portion 20 of the enclosure 12 with the air intake portion 20 facing into the wind to efficiently harness wing energy and convert the wind energy to electric energy.

Figure 4:
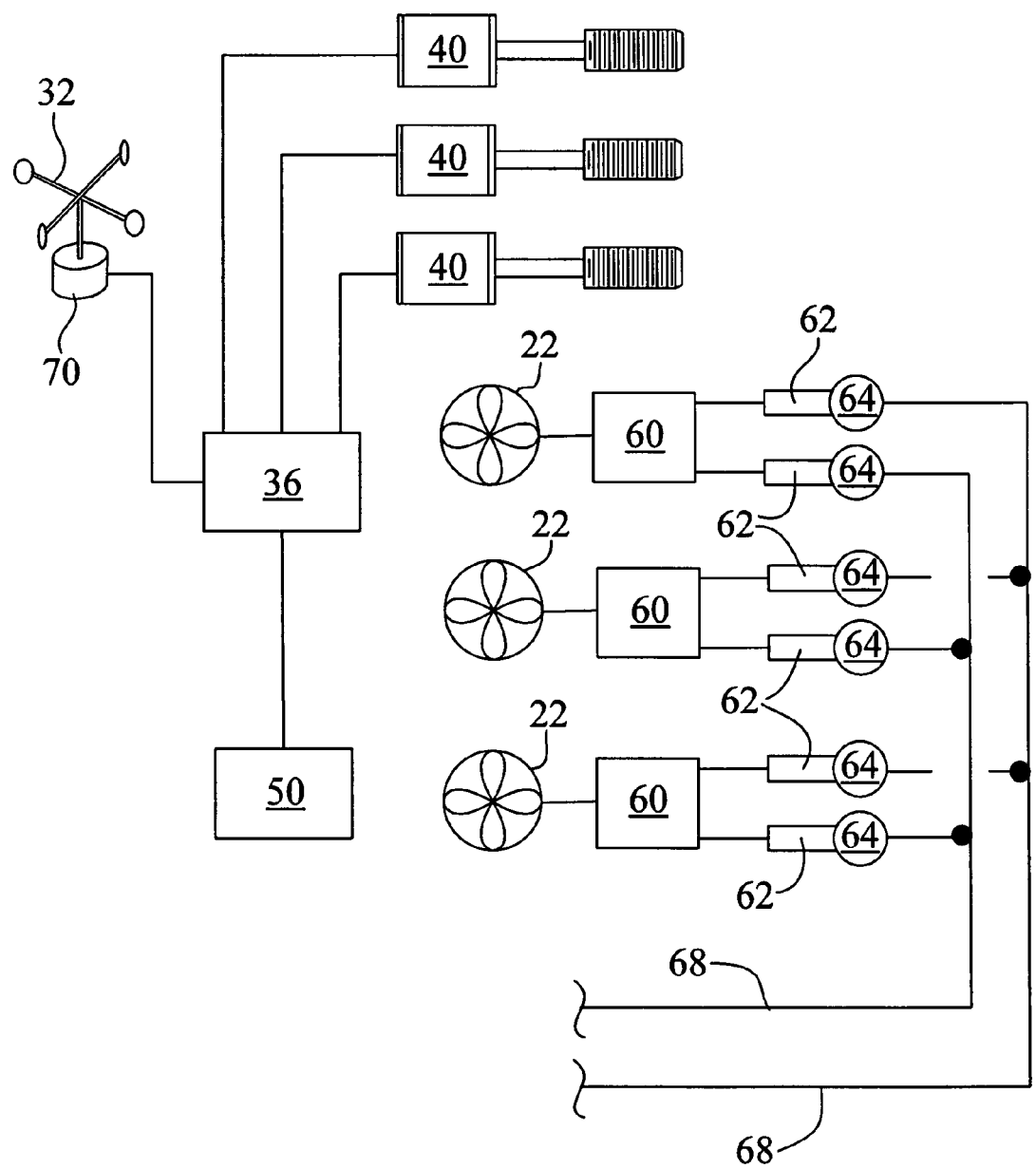
FIG. 4 is a schematic block diagram representation of the microprocessor based iris control unit together with iris drive motors for adjusting the diameter of the opening in the irises, wind turbine generators and air speed sensor in accordance with the inventive disclosures herein.

FIG. 4 is a schematic block diagram representation of the microprocessor based iris control unit together with iris drive motors for adjusting the diameter of the opening in the irises, wind turbine generators and air speed sensor in accordance with the inventive disclosures herein. Wind turbine fan blades 22 rotatably drive electric generators 60. Electric generators 60 deliver generated electric power to the outside world through brushes 62 engaging with copper rings 64. Copper rings 64 are secured to the vertical support member 58 or vertical support column (also 58). The copper rings 64 and brushes 62 permit electric power to be delivered to electrical conductors 68 in the vertical support member 58 and therethrough delivered to the outside world. At least one electric generator 60 is connected to recharge the storage batteries 50. The rings 64 and pickup brushes 62 permit the enclosure 12 to rotate on the vertical support member 58 while providing for the transfer of generated electrical power between the enclosure housing the wind turbines and generators and the vertical support member and thereby out to the outside world.

The wind speed sensor 32 includes a small electric generator 70 configured to provide electrical power to the microprocessor based iris control unit 36. The electrical power requirements of the microprocessor based iris control unit 36 are supplemented by power provided by storage batteries 50. The microprocessor based iris control unit 36 is electrically interfaced to the iris drive motors 40 and controls the variable diameter opening 30 of each iris to optimize electrical power generation by the wind-powered generator 10.

The discussed construction, illustrations and sequence of operation are for one embodiment of the invention, but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, and mechanical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A wind-powered generator for generating electric power over a wide range of wind conditions, comprising:
   a vertical support member for supporting the wind-powered generator;
   an enclosure comprising:
      at least one ducted chamber sized and adapted to receive a wind turbine therein, said ducted chamber configured to guide wind driven airflow in passing through said enclosure with wind entering an air intake portion of said enclosure and exiting an air exhaust portion of said enclosure; and
      at least one fin secured to a top portion of said enclosure, said fin sized and adapted to urge said enclosure to rotate upon said vertical support member such that said air intake portion of said enclosure is adjusted to a position in which wind impinges upon said air intake portion of said enclosure;
   at least one wind turbine, each wind turbine comprising:
      a turbine shaft rotatably mounted into said ducted chamber;
      a plurality of turbine fan blades, said fan blades secured onto and about a portion of said turbine shaft;
      a generator having a rotor driveably coupled to said turbine shaft;
      a plurality of rows of magnetic irises, said magnetic irises each having an opening in a center portion of said iris, said turbine shaft passing through said opening, an adjustable diameter of said opening adjustable between a minimum diameter and a maximum diameter; and a means of adjusting said adjustable diameter of said irises;

wherein wind impinging upon said fan blades urges said turbine shaft to rotate, said rotating turbine shaft driveably rotating said generator rotor; and wherein said turbine converts said wind power to electrical power;

a wind speed sensor secured to an exterior surface of said enclosure, said wind speed sensor configured to produce an electrical signal proportional to wind speed measured by said wind speed sensor;

a microprocessor based iris control unit secured in said enclosure, said wind speed sensor and said means of adjusting said irises electrically interfaced to said iris control unit, said microprocessor based iris control unit configured and adapted to command said means of adjusting said irises to adjust said adjustable diameter of each iris so as to maximize power output of said generators according to said wind speed signal; and at least one rechargeable battery secured to said enclosure, said battery to provide continuous power to said iris control unit, said battery rechargeable by said generators.

2. The wind-powered generator for generating electric power over a wide range of wind conditions according to claim 1, wherein said vertical support member includes and has attached thereto at least two annular copper pickup rings; and wherein said generators transfer electrical energy to said annular pickup rings by way of electrically conducting brushes positioned to contact said annular rings and electrically connected to transfer generated power from said generators in said rotatable enclosure to said annular rings of said vertical member.

3. The wind-powered generator for generating electric power over a wide range of wind conditions according to claim 2, wherein said vertical support member includes lubricated ball bearings interfacing and supporting said enclosure upon said vertical support member, wherein said lubricated ball bearings are operative to reduce force required to rotate said enclosure on said vertical support member, thereby improving the performance of said fin in keeping said intake portion of said enclosure facing into said wind.

4. The wind-powered generator for generating electric power over a wide range of wind conditions according to claim 3, wherein said vertical support member is a cylindrical column.

5. The wind-powered generator for generating electric power over a wide range of wind conditions according to claim 2, wherein said irises and iris control unit adapt said wind-powered generator to generate electric power from wind gusts and higher speed winds by regulating airflow through said turbine fan blades, said airflow regulated by real time adjustment of said adjustable diameter of said irises in response to wind speed sensed by said wind speed sensor.

6. The wind-powered generator for generating electric power over a wide range of wind conditions according to claim 5, wherein said enclosure includes a small electric generator rotatably connected to said wind speed sensor, said wind speed sensor operating said small generator to generate electric power, said electric power from said small generator configured to supplement electric power to said microprocessor based iris control unit.

7. The wind-powered generator for generating electric power over a wide range of wind conditions according to claim 6, wherein said plurality of wind turbines in said enclosure is six wind turbines.

8. The wind-powered generator for generating electric power over a wide range of wind conditions according to claim 7, wherein said air intake portion of said enclosure: is beveled to improve airflow through said wind turbines.

9. The wind-powered generator for generating electric power over a wide range of wind conditions according to claim 8, wherein each iris includes gear teeth formed on a periphery edge of said iris; and wherein said means of adjusting said iris comprises an electric motor driving a screw, said screw meshably engaging said gear teeth of said iris.

10. The wind-powered generator for generating electric power over a wide range of wind conditions according to claim 9, further comprising an electric motor driveably coupled to rotate said enclosure on said vertical support member, wherein said microprocessor based iris control unit is configured and adapted to command said electric motor to rotate said enclosure to maintain said air intake portion facing the wind.

11. The wind-powered generator for generating electric power over a wide range of wind conditions according to claim 7, wherein said turbine fan blades are based on a jet engine fan blade design.

12. The wind-powered generator for generating electric power over a wide range of wind conditions according to claim 11, wherein said enclosure comprises carbon fiber.

13. The wind-powered generator for generating electric power over a wide range of wind conditions according to claim 12, wherein each iris is one quarter inch thick and wherein said irises are spaced to provide one quarter inch of space between adjacent irises.

* * * * *